US005220858A

United States Patent [19]

Allen et al.

[11] Patent Number: 5,220,858

[45] Date of Patent: Jun. 22, 1993

[54] METHOD AND APPARATUS FOR FORMING SCORED LINES ON SHEET MATERIAL

[75] Inventors: Roger A. Allen, Prestwood; John Mariner, Gerrards Cross, both of England

[73] Assignee: Samuel Jones & Co. Limited, Gerrards Cross, England

[21] Appl. No.: 959,478

[22] Filed: Oct. 9, 1992

Related U.S. Application Data

[63] Continuation of Ser. No. 522,822, May 14, 1990, abandoned.

[30] Foreign Application Priority Data

Jun. 13, 1989 [GB] United Kingdom ................. 8913564
Oct. 4, 1989 [GB] United Kingdom ................. 8922361

[51] Int. Cl.$^{5}$ ......................... B32B 31/18; B26D 3/08

[52] U.S. Cl. ....................................... 83/880; 83/881; 83/885; 493/403; 156/268

[58] Field of Search ................. 83/880, 881, 882, 886, 83/887; 493/396, 400, 402, 403; 156/268

[56] References Cited

U.S. PATENT DOCUMENTS

| | | | |
|---|---|---|---|
| 3,198,093 | 8/1965 | Kirby et al. | 493/371 |
| 3,379,814 | 4/1968 | Bracey | 83/880 |
| 3,731,600 | 5/1973 | Earp | 493/400 |
| 3,744,384 | 7/1973 | Jarritt et al. | 493/403 |
| 3,850,059 | 11/1974 | Kang | 83/880 |
| 3,859,156 | 1/1975 | Morgan | 156/268 |
| 3,977,310 | 8/1976 | Keck et al. | 83/880 |
| 4,195,556 | 4/1980 | Gallagher et al. | 493/403 |
| 4,517,873 | 5/1985 | Wilson | 83/881 |
| 4,678,457 | 7/1987 | Slobodkin | 493/355 |
| 4,698,052 | 10/1987 | Slobodkin | 493/355 |
| 4,856,400 | 8/1989 | Kelzer | 83/885 |

*Primary Examiner*—William E. Terrell
*Attorney, Agent, or Firm*—Mason, Fenwick & Lawrence

[57] ABSTRACT

Apparatus and method for cutting partially through the layers of a laminate. The invention uses a roller having a resilient surface of specified hardness over which are stretched a number of wires extending helically about its circumference, so that the wires are supported on the tool surface by the resilient layer. A cooperating hard surfaced roller applies a controlled amount of pressure to the sheet material in a nip formed with the scoring roller. This arrangement provides highly even score lines.

21 Claims, 2 Drawing Sheets

METHOD AND APPARATUS FOR FORMING SCORED LINES ON SHEET MATERIAL

This application is a continuation of application Ser. No. 07/522,822, filed May 14, 1990, abandoned.

DESCRIPTION

This invention relates to a method and apparatus for forming non-penetrative scored lines on sheet material, e.g. paper, more particularly, but not exclusively, for use in the manufacture of adhesive label laminates.

Adhesive label laminates usually consist of a release sheet or liner carrying a release coating, typically a silicone coating, which supports a label sheet having on its reverse a coating of pressure sensitive adhesive. The characteristics of the release coating ensure that one element of the laminate can be readily peeled from the other, and that the adhesive remains on the label sheet.

However, when a label is required for use, difficulties can arise in peeling the release liner from the label due to the fact that no available edge of the backing sheet is exposed to be gripped by the fingers to enable peeling to be effected.

U.S. Pat. No. 3,859,157 proposes as a solution to this problem the provision of scored lines of weakness on the reverse of the release liner. When the laminate is then flexed about an axis generally parallel to a scored line, the release liner cracks along the scored line to present two edges which can be gripped to peel the liner from the label.

The apparatus proposed in the above mentioned U.S. Patent Specification for the formation of such scored lines consists of two metal rolls which form a nip, with one of the rolls having a series of spaced parallel wires secured so as to extend axially, helically or circumferentially across the surface thereof. Transverse, diagonal or longitudinal scored lines are formed on the label laminate by passing the release liner through the roll nip with the non release coated face presented for engagement with the wires. The nip pressure is sufficient to compact the paper along the scored lines and to render the paper locally weakened.

It has been found, however, that apparatus of the kind described cannot be relied upon to produce scored lines of consistent depth. This may principally be due to the lack of resilience of the surfaces of either of the metal rolls, which manifests itself as insensitivity to variations in laminate thickness, or may be due to mechanical inaccuracies in the rolls due to manufacturing tolerances or may be due to roll deflections during use. As a result, for a given nip pressure between the rolls, the release liner will unpredictably be under scored or over scored or unevenly scored. Such a liner will either not crack along a scored line when required to do so, or a cut will be formed through the liner and sometimes into the label sheet.

A solution to the problem of variability in scoring described above is proposed in the U.S. Pat. Nos. 4,678,457 and 4,698,052. U.S. Pat. No. 4,678,457 teaches the replacement of the metal roll of U.S. Pat. No. 3,859,157 which carries circumferential scoring wires with a series of spaced and independently mounted rotary crush scoring knives extending in spaced relation across the width of the smooth metal backing roll, and each formed with a rounded crushing edge. U.S. Pat. No. 4,698,052 teaches the replacement of the metal backing roll of U.S. Pat. No. 3,859,157 with a series of spaced and independently mounted anvil rollers extending in staggered relation across the width of the wire wound metal scoring roll.

The crush scoring knives of U.S. Pat. No. 4,678,457 and the anvil rollers of U.S. Pat. No. 4,698,052 are each carried in a mounting bracket which is biased towards the co-operating backing or scoring roller by air pressure, but which is mounted in such a manner that movement towards or away from the co-operating roller is in an essentially friction-free manner.

The use of friction-free moveable mounting brackets as described above enables the crush scoring knives or anvil rollers to float with fluctuations in paper thickness, and thus overcomes the over and under scoring problem experienced with the apparatus of U.S. Pat. No. 3,859,157.

It is among the objects of the present invention to provide an alternative method and apparatus for forming scored lines on sheet material, especially label laminates, which takes account of variability in laminate thickness, and which has particular advantages for use in the formation of scored lines at an acute angle, typically 45° to the longitudinal axis of the sheet.

According to the invention there is provided a method of forming a scored line on a sheet of scorable material comprising the step of passing the sheet through the nip of a pair of contra-rotating rolls, one of which rolls has a hard surface and the other of which rolls has a resilient surface and one or other of which rolls has at least one scoring element extending over its surface. It has been found that by this method the scoring element is pressed evenly into the sheet to be scored irrespective of the normally occurring variations in thickness of the sheet as described previously. It is assumed that during the scoring process the scoring element resiliently deforms the resilient surface of one of the rolls to a varying extent to compensate for the varying thickness of the sheet so that the scoring remains substantially constant.

Preferably the arrangement is such that this scoring element is disposed on the roll having a resilient surface. Preferably the resilient surface has a Shore D hardness in the range of about 60° to about 85° measured according to International Standard ISO 868-1978 (British Standard BS2782:Part 3:Method 365B:1981 or Standard D2240 of the American Society for Testing Materials).

Preferably the method comprises the step of applying pressure to the rolls to control the nip. The nip pressure of the rolls will preferably lie in the range 70 to 160 lb (32 to 73 kgs) per wire when scoring sheets of paper.

Preferably the method comprises the preliminary step of adjusting the pair of rolls so that the axis of one of them is disposed either upstream or downstream with respect to the axis of the other roll to a small extent e.g. by an amount of around 1 mm.

The method may comprise the preliminary step of arranging the hard roll to form a nip only with its central portion so as to leave marginal portions of the sheet unscored.

The method may comprise the preliminary step of skewing the axes of the pair of rolls relative to one another to a small extent or for example one or two degrees.

The method may comprise the preliminary step of wrapping a scoring element helically round the resilient roll and tensioning the scoring element.

From another aspect the invention provides a method of making a laminate for use in making a label or the like from a paper fibrous material layer, comprising the steps of applying a liquid release coating to one surface of the paper layer and drying it thereon, thereafter forming a plurality of weakened reduced thickness score lines in the other surface of the paper layer by passing the paper layer through the nip of a pair of contra-rotating rolls, one of which rolls has a hard surface and the other of which rolls has a resilient surface and one or other of which rolls has at least one scoring element extending over its surface, and laminating a layer of adhesive and a face sheet to said paper layer with said adhesive layer being intermediate the paper layer and the sheet and being bonded to the said one surface of the paper layer.

From yet another aspect the invention is a sheet of scorable material scored by the method described above.

A sheet of scorable material scored by the method described above can be distinguished from a sheet secured by previously known processes in that the method of the present invention provides an exceptionally even score. Usually the even score is such as to be readily distinguishable by eye from scores made in paper and the like by known scoring processes.

From another aspect the invention is a flexible laminate for use as a label or the like, comprising a face sheet, a layer of pressure sensitive adhesive secured to the back surface of said face sheet, and a fibre paper backing layer removably secured to said adhesive layer, the paper backing layer having a release coating on its surface engaging the adhesive layer and having a reduced thickness potential tear line formed therein, the fibres of the paper backing layer being compacted at the potential tear line by passing the backing layer through the nip of a pair of contra-rotating rolls, one of which rolls has a hard surface and the other of which rolls has a resilient surface and one or other of which rolls has at least one scoring element extending over its surface.

From another aspect the invention provides a rotatably mounted and substantially rigid scoring roll, for use in co-operation with a substantially rigid and rotatably mounted anvil roll having a hard surface, to form a nip through which scorable material, such as paper, can be passed for the formation of scored lines thereon, said scoring roll having one or more linear scoring elements extending over a resilient surface layer formed on said scoring roll, said surface layer having Shore D hardness in the range of about 60° to about 85° measured according to International Standard ISO 868-1978 (British Standard BS2782:Part 3:Method 365B:1981 or Standard D2240 of the American Society for Testing Materials).

In another aspect, the invention provides apparatus for forming scored lines of a required depth on a sheet of scorable material, comprising a rotatably mounted and substantially rigid scoring roll having one or more linear scoring elements extending across the surface thereof, a substantially rigid anvil roll having a hard surface and rotatably mounted in substantially parallel relation to said scoring roll to define a nip therewith, and means for generating pressure between said rolls at said nip to form scored lines of the required depth on said scorable material during passage thereof through said nip, with one of said rolls having a resilient surface layer formed thereon having a Shore D hardness in the range of about 60° to about 85° measured according to International Standard ISO 868-1987 (British Standard BS2782:Part 3:Method 365B:1981 or Standard D2240 of the American Society for Testing Materials).

In a further aspect, the invention provides apparatus for forming scored lines of a required depth on a sheet of scorable material, comprising a steel scoring roll having a plurality of tensioned wires between about 1.1 mm and 1.4 mm in diameter, extending helically, and in substantially parallel relationship across a resilient surface layer formed on said roll and having a Shore D hardness in the range of about 60° to about 85° measured according to International Standard ISO 868-1978 (British Standard BS2782:Part 3:Method 365B:1981 and Standard D2240 of the American Society for Testing Materials), a steel anvil roll, means for mounting said scoring and anvil rolls for rotation about substantially parallel horizontal axes, means for moving at least one of said rolls towards the other roll to form and generate pressure at a nip, so that contra-rotation of said rolls to draw a sheet of scorable material through said nip will generate on said material a series of parallel scored lines of the required depth extending at an acute angle to the direction of movement of said material.

It will be understood that the required depth of score will vary depending upon the material being scored and the purpose for which the score is being applied. Furthermore, for any particular material being scored, variations in the depth of score within certain limits are in practice acceptable. The term "required depth" is understood as being any depth of score within such acceptable limitations.

Preferably the scoring and anvil rolls are made of steel and the resilient material with which one or other of the rolls is coated is preferably polyurethane. Preferably, the resilient material has a Shore D hardness of about 70° to about 80° measured as specified above and optimally the hardness is about 75°.

Use of a resilient surface layer having a hardness of less than about 60° results in uncontrollable variability in the scored lines, and generally to underscoring. If the hardness is greater than about 85°, the roll system is insufficiently sensitive to variations in laminate thickness and over or under scoring results.

The rolls may be disposed with their axes extending horizontally and with the anvil roll positioned substantially vertically above the scoring roll.

The axis of the anvil roll may be offset slightly upstream or downstream on the axis of the scoring roll in the direction of sheet movement, for example by an amount of 1 mm. Such an offset has been found to afford increased stability of operation.

Advantageously, the anvil roll is also formed with a central land which forms the nip with the scoring roll so that scoring is not effected across the full width of the scored web. This has been found to give more reliable operation, in that the full tensile strength of the web is present at the web edge, so reducing the chance of the web breaking. Furthermore, the axis of the anvil or scoring roll may be skewed very slightly, for example by 1° or 2° with respect to the axis of the other roll, the amount of skew depending on the length of the rolls. Such skewing can sometimes improve the pressure distribution across the nip, depending on the length, diameter and degree of flexibility, perpendicular to their axes, of the scoring and anvil rolls.

The linear scoring elements preferably present a radiused edge, having a diameter of about 1.2 mm. The use of wire, such as 18 gauge piano wire, having a diameter of 1.15 mm, has been found to be satisfactory and that simple tensioning of such wire across the surface of the roll affords adequate stability. The use of linear scoring elements which have too small a diameter, for example 0.5 mm or the use of linear scoring elements of too great a diameter, for example 2.0 mm will require different and excessive nip pressures in order to achieve scoring. Also the performance of the final product may not be as acceptable.

The linear scoring elements are preferably straight and extend in parallel relation across the surface of the scoring roll. However, the use of divergent or convergent elements is not excluded, provided that they do not intersect. The linear scoring elements may also have other configurations, for example a sinusoidal configuration.

The use of axially aligned linear scoring elements is undesirable since their use might lead to excessive repetitive shocks on the roller bearings as the scoring elements enter the nip, especially during high speed operation. In addition very high nip pressures would be required to achieve scoring since adequate pressure would need to be applied to the entire length of each scoring element as it passes through the nip.

Circumferentially extending linear scoring elements may be used for the formation of longitudinal score lines in the sheet, provided that they extend across a resilient surface formed on the roll in accordance with the invention. If the wires are applied circumferentially to a metal surfaced roll, wire movement may otherwise take place as a result of slackening caused by localised stretching produced when the wire is subjected to nip pressure.

The invention will now be further described with reference to the accompanying drawings in which:

FIG. 1 a semi-diagrammatic front elevation, partly in section of a scoring apparatus according to the invention;

Figure 1:
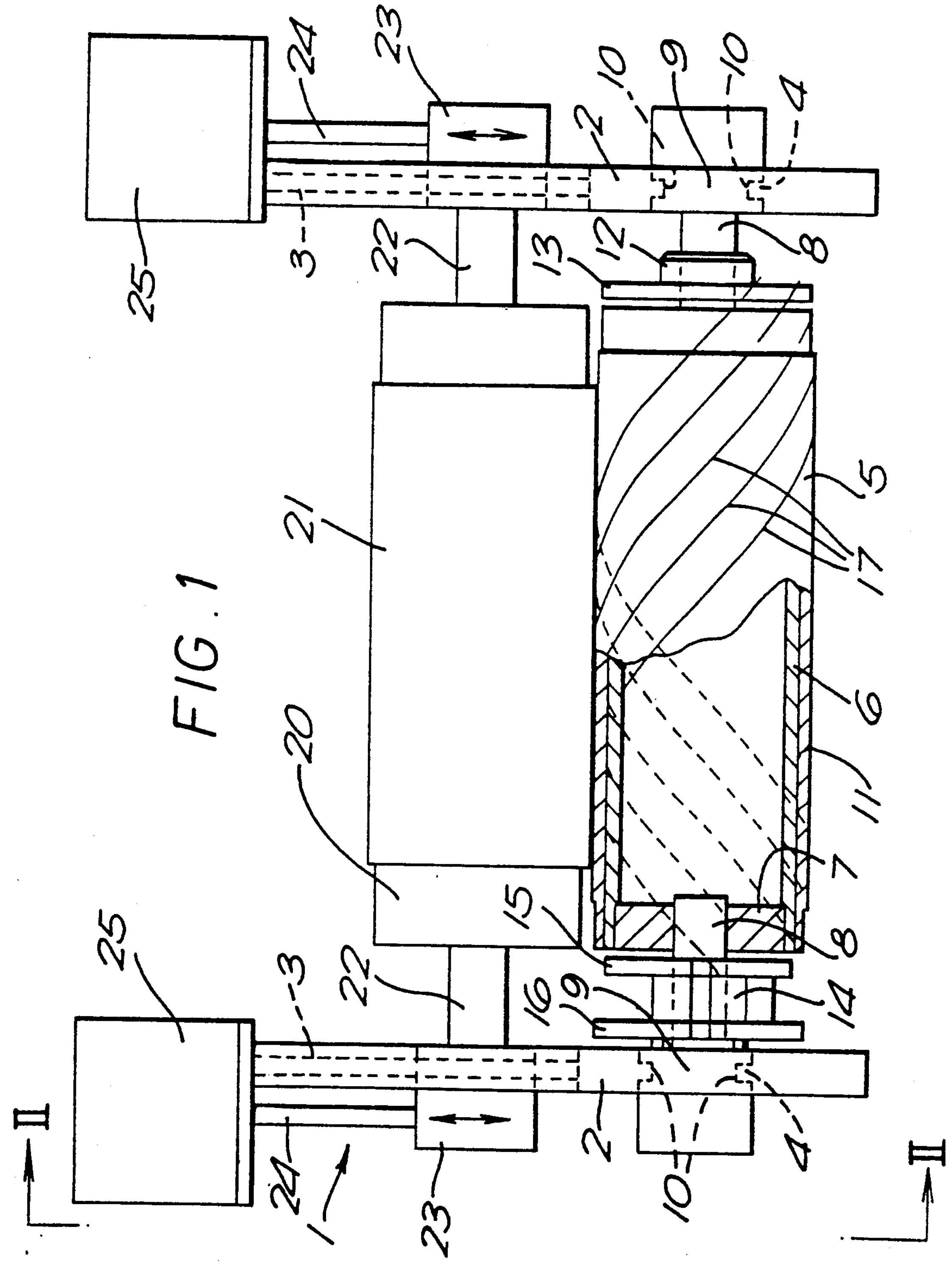
Figure 2:
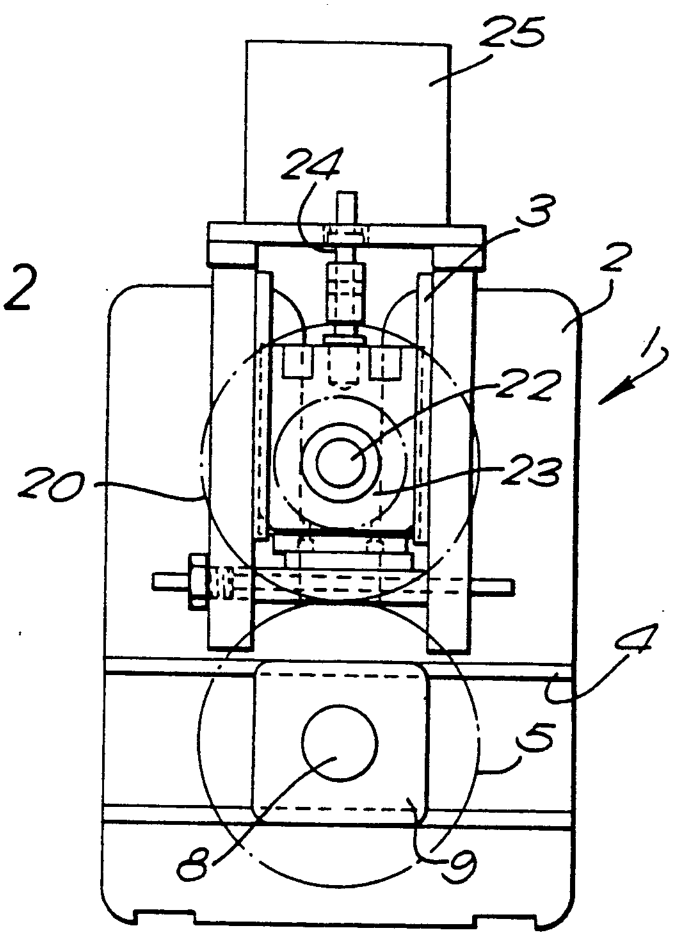
FIG. 2 is an end elevation on the line II—II of FIG. 1.

Referring first to FIGS. 1 and 2 of the drawings, the apparatus 1 shown comprises a pair of vertical side frames 2 each formed with a vertical slideway 3 at the upper end and a horizontal slideway 4 at the lower end.

A roll 5 comprises a cylindrical steel shell 6 extending between end plates 7, the end plates 7 being carried on stub shafts 8. The stub shafts 8 are journalled for rotation in bearing blocks 9 having horizontal slideways grooves 10 co-operable with the horizontal slideways 4. The bearing blocks 9 are secured in the required position in the slideways 4 by conventional jacking bolts (not shown) whereby the axis of rotation of the roll 5 can be shifted in a horizontal plane.

The surface of the cylindrical shell 6 carries a resilient sheath 11, 12 mm thick, of polyurethane resin. The cured resin has Shore D hardness of around 75° measured according to International Standard ISO 868-1978 (British Standard BS2782:Part 3:Method 365B:1981 or Standard D2240 of the American Society for Testing Materials).

At one end of the roll 5, the stub shaft 8 has a flanged boss 12 secured thereon, with the flange 13 thereof having a diameter slightly larger than that of the cylindrical shell 6. A series of regularly spaced small axially extending apertures (not shown) are formed in the flange 13 near the periphery thereof, with each hole being intersected by a threaded radial hole (not shown) in which a grub screw (not shown) is engaged.

At the other end of the roll 5 a further boss 14 is secured on the other stub shaft 8. The boss 14 carries two flanges, 15 and 16. The flange 15 has secured in the periphery thereof a series of radially extending and regularly spaced steel pins (not shown) formed with apertures extending parallel to the axis of the roll 5. The flange 16 is formed with axially extending and regularly spaced threaded radial holes (not shown) each fitted with a grub screw essentially as described with reference to the flanged boss 12.

A series of 18 gauge wires (1.2 mm in diameter) are passed through the axial holes in the flange 13 and the wire ends secured by tightening the grub screws. The wires are laid helically and in parallel relation across the surface of the polyurethane coating 11 and at an angle of 45° to the axis of the roll 5. At the other end of the roll 5, the wires are passed around the radially extending pins located in the flange 15 and then through the axially extending apertures in the flange 16, where, after tensioning, they are secured by tightening the grub screws. The wires could alternatively be tensioned with springs as shown in the prior art.

Mounted immediately above the roll 5 is a hardened steel roll 20 having reduced diameter ends so as to leave a central land 21. The roll 20 is carried on stub shafts 22 rotatably mounted in vertically slidable bearing blocks 23. The bearing blocks 23 are formed with slideway grooves 26 and are mounted for vertical sliding movement in the slideways 3 of the frames 2, and are connected by piston rods 24 to pneumatic piston and cylinder units 25. The piston and cylinder units 25 are of a conventional kind. Appropriate control of air pressure facilitates raising or lowering of the roll 20 and generation of nip pressure when a nip is formed between the rolls 5 and 20.

Figure 3:
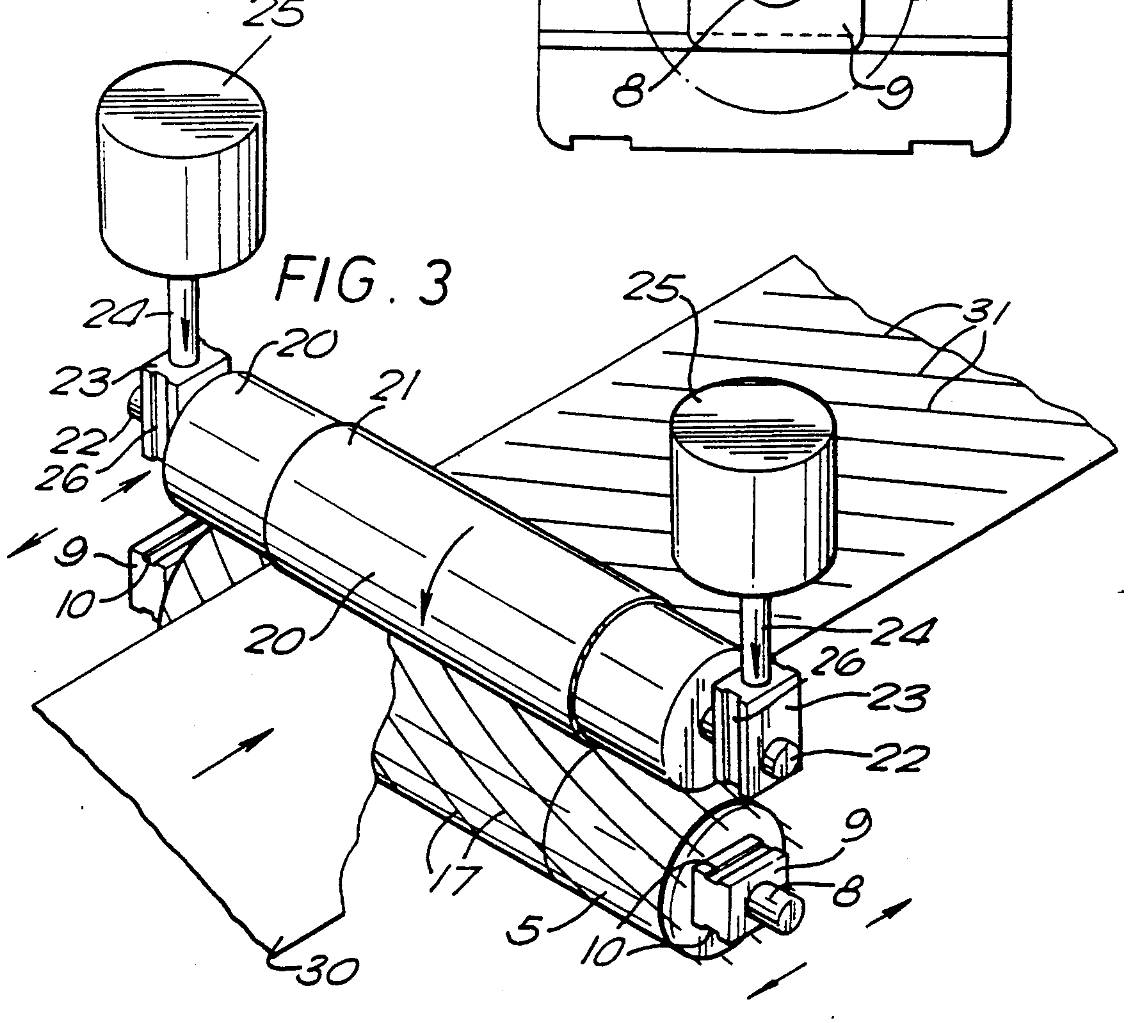
FIG. 3 is an isometric view of the apparatus of FIG. 1 in use for scoring the reverse of the release sheet of an adhesive laminate.

Turning now to FIG. 3, this shows the essential features of the apparatus of FIGS. 1 and 2 when in use to form diagonal scored lines on the reverse of a release sheet 30. The sheet 30 is fed through a nip formed between the rotating rolls 20 and 5 at which nip pressure is generated by the pneumatic piston and cylinder units 25. As a result, the wires 17 generate diagonal scored lines 31 on the release sheet 30, the scored lines extending across a width corresponding to the width of the land 21. Due to the resilience of the layer 11, continuous scored lines of the required depth are formed.

The scoring process can be fine tuned by adjusting the position of the roll 5 with respect to the roll 20 either upstream or downstream to a small extent, e.g. by 1 mm, and/or by skewing the axis of the roll 5 slightly, e.g. by 1 or 2 degrees, relative to the axis of the roll 20. This adjustment is carried out by moving the positions of the bearing blocks 9 in the slideways 4.

It will be apparent that modifications to the embodiment shown may be adopted without departing from the invention. Thus, for example, the wires 17 may be laid down directly on the cylindrical steel shell 6 of the roll 5, with the resilient coating 11 being applied to the land 21 of the roll 20. This will produce scored lines marginally less sharp than those produced by the embodiment above described, but they will generally be of acceptable quality. It is sufficient for the accomplishment of the invention that a single resilient layer of the specified hardness should be present as one of the roll surfaces at the nip.

We claim:

1. A method of forming a scored line on a sheet of scorable material comprising the steps of passing the sheet through the nip of a pair of contra-rotating rolls, one of which rolls has a hard surface and the other of which rolls has a resilient surface layer having a Shore D hardness in the range 60° to 85° and has at least one scoring element extending over said resilient surface layer, said scoring element being a tensioned wire, and applying a controlled amount of nip pressure to the rolls to exert a controlled pressure on said sheet.

2. A method according to claim 1, wherein said nip pressure is in the range of 32 to 73 kgs per scoring element.

3. A method according to claim 2, further comprising the preliminary step of adjusting the pair of rolls so that the axis of one of them is offset with respect to the axis of the other roll.

4. A method according to claim 3, further comprising the preliminary step of arranging the hard roll to form a nip only with its central portion so as to leave marginal portions of the sheet unscored.

5. A method according to claim 4, further comprising the preliminary step of skewing the axes of the pair of rolls relative to one another.

6. A method according to claim 5, further comprising the preliminary step of wrapping the tensioned wire scoring element helically around the resilient roll.

7. A method according to claim 1, further comprising the preliminary step of wrapping the tensioned wire scoring element helically round the resilient roll.

8. A method according to claim 1, further comprising the preliminary step of adjusting the pair of rolls so that the axis of one of them is offset with respect to the axis of the other roll.

9. A method according to claim 8, further comprising the preliminary step of arranging the hard roll to form a nip only with its central portion so as to leave marginal portions of the sheet unscored.

10. A method according to claim 9, further comprising the preliminary step of skewing the axes of the pair of rolls relative to one another.

11. A method according to claim 10, further comprising the preliminary step of wrapping the tensioned wire scoring element helically around the resilient roll.

12. A method according to claim 1, further comprising the preliminary step of arranging the hard roll to form a nip only with its central portion so as to leave marginal portions of the sheet unscored.

13. A method according to claim 12, further comprising the preliminary step of skewing the axes of the pair of rolls relative to one another.

14. A method according to claim 1, further comprising the preliminary step of skewing the axes of the pair of rolls relative to one another.

15. A method according to claim 14, further comprising the preliminary step of wrapping the tensioned wire scoring element helically around the resilient roll.

16. Apparatus for forming a scored line on a sheet of scorable material comprising:

a pair of contra-rotating rolls having a nip between them for engaging the sheet of scorable material as it passes therethrough, one said roll having a hard surface, the other said roll having a resilient surface layer having a Shore D hardness in the range of 60° to 85°, at least one scoring element extending over said resilient surface of said other roll, said scoring element being a tensioned wire, and means for applying a controlled amount of nip pressure to said rolls to exert a controlled pressure on said sheet.

17. Apparatus according to claim 16, wherein the tensioned wire scoring element extends helically across the resilient surface layer.

18. Apparatus according to claim 16, and further comprising means for positioning the axis of the anvil roll offset from the axis of the scoring roll.

19. Apparatus according to claim 16, wherein the anvil roll is formed with a central land which forms the nip with the scoring roll so that scoring is effected across the full width of the scored web, only in the central portion of a sheet, thereby leaving marginal portions on the unscored sheet.

20. Apparatus according to claim 16, and further comprising means for positioning the axis of one roll skewed with respect to the axis of the other roll.

21. The apparatus according to claim 16, wherein said pressure applying means comprises means for applying pressure in the range of 32 to 73 kgs per scoring element.

* * * * *